Feb. 21, 1939.   F. L. SCOTT   2,147,927
CONE CUTTER SUPPORT
Filed April 30, 1937
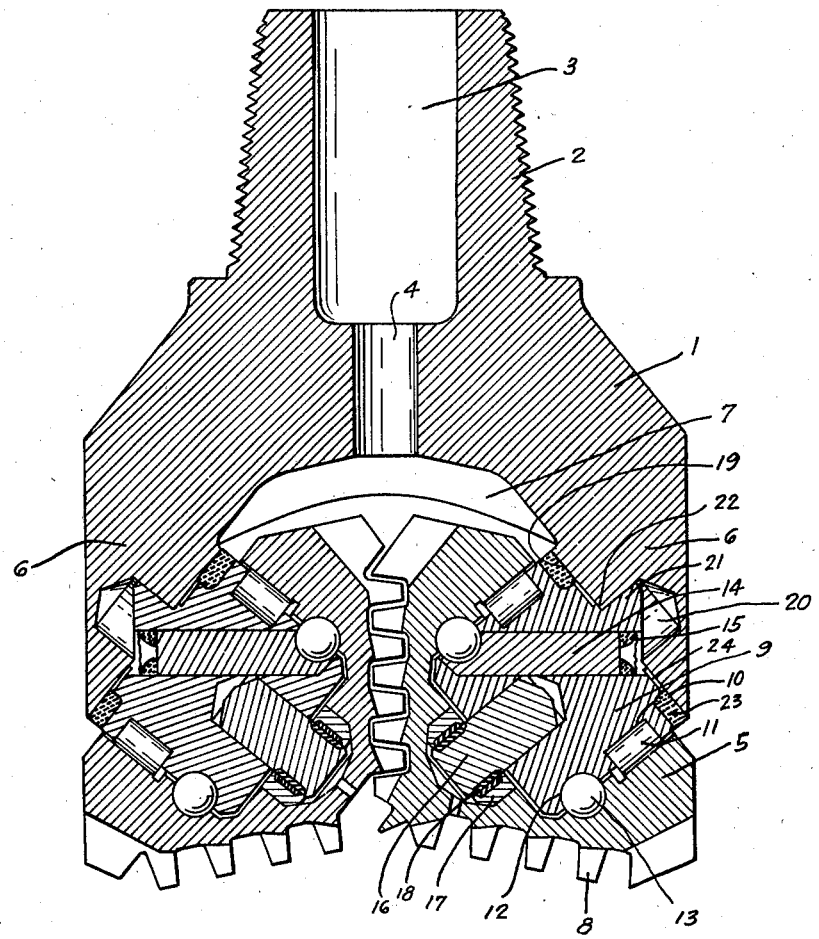
Floyd L. Scott
INVENTOR
BY Jesse R. Stone
ATTORNEY Patented Feb. 21, 1939

2,147,927

UNITED STATES PATENT OFFICE 2,147,927

CONE CUTTER SUPPORT

Floyd L. Scott, Houston, Tex., assignor to Hughes Tool Company, Houston, Tex., a corporation of Delaware Application April 30, 1937, Serial No. 139,875

4 Claims. (Cl. 255—71)

The invention relates to well drills such as are employed in drilling deep wells particularly in hard formations. It has particular application to drills with cone shaped cutters thereon.

Drills with so called cone cutters ordinarily have a head with two or more cone shaped cutters mounted on the lower end thereof. In order to mount the cutters on their inwardly inclined shafts, it is common to form the drill head in longitudinal sections, each with a cutter thereon and to then fix the said sections rigidly together to form a unitary head. The cutters may be mounted on the head only when it is in sections.

It is an object of my invention to make the cutter shafts separate from the head so that the head may be made integral.

I desire to provide a simple type of structure for the cutter supporting shaft, whereby it may be inserted into position on the head with the cutter secured thereon and the shaft then welded to the head firmly and securely.

I have as an object to provide a shaft that may be easily mounted in the head and again removed with the cutter thereon when the cutter is worn out and a new cutter and shaft substituted therefor.

The invention includes a registering or locating structure upon the shaft, which fits against a recess on the head to indicate when the cutter and shaft are properly positioned.

In the drawing is shown a central vertical section through a drill embodying the invention.

The drill head 1 is an integral structure with an upwardly tapered and threaded shank 2 for engagement with the drill collar, tool joint, or the like. The shank has a chamber or passage 3 therein from which one or more water passages 4 discharge the flushing fluid to the cutters 5.

The head 1 has a plurality of downwardly extending legs 6 to support the cutters and between said legs is a pocket 7 within which the cutters are partly housed.

The cutters 5 are approximately conical shaped shells having teeth 8 on their outer cutting surfaces, the circumferential rows of teeth on one cutter being arranged in offset relation to those on adjacent cutters so that they may extend across the axis of rotation of the drill and interfit as shown.

Each cutter shell encloses the end of a shaft 9 upon which it is rotatably supported and is formed on its inner surface to fit said shaft and the anti-friction bearings thereon. I form the shaft separate from the head and the cutter is mounted thereon before the shaft is secured to the leg of the drill.

Said shaft is approximately cylindrical, but has a raceway 10 adjacent the base of the cutter for the rollers 11. Farther inwardly is a raceway 12 for the balls 13. Said balls lock the cutter on the shaft. They are inserted into the raceway through a bore in the shaft which is then filled up by a plug 14 held in place by welding material 15.

The forward end of the shaft is recessed to receive a pilot bearing pin 16 which projects from the end of the shaft and forms an end bearing to take the lateral thrust. A bushing 17 is fitted within the cone to receive the pin 16 and the contacting faces of the pin and bushing are hard faced at 18 with stellite or other similar hard metal.

To receive the shaft, the inner face of the leg 6 is flattened off at 19 to form a circular face cooperating with the end of the shaft. This flattened face is formed with a cylindrical counterbore 20 as shown. The shaft has its outer end formed with a projection 21 rounded on its upper side, forming a shoulder to fit the upper wall of the counterbore 20 and to center the shaft in position. The end of the projection 21 is beveled off to allow the projection to pass into the recess when the shaft with the cutter thereon is moved directly upwardly into position.

The outer face of the shaft has a shoulder 22 adjacent the projection 21 to fit against the face of the leg. Around the outer margin is a recess to receive a bond of welding metal 23 by means of which the shaft is secured in place. Between this welding metal recess and the shoulder 22 is an open space at 24 which is of use in indicating to the welder when the bond of welding metal 23 has been cut away in the removal of the shaft.

This invention may be employed on drills having two, three, or more cutters thereon. When the cutters are to be assembled on the head, they are placed in interfitting position and the assembly is then moved directly upwardly longitudinally of the cutter axis into position with the ends of the projections 21 engaging within the counterbores 20 as described. The bond of welding metal 23 is then employed on each shaft to fix it rigidly in place so that the shafts, in effect, become an integral part of the head. When the drill has been used and the cutters worn out, the whole assembly of cutters and shafts may be removed and replaced by a new set. This is done by cutting away the welded metal 23 by use of a torch so that the old set may be taken out.

While I have shown a particular construction of cutter and bearings on the shaft, it will be apparent that the invention is independent of the form of the bearings or of the cutter teeth. When used with the anti-friction bearings, however, the end of the plug 14 is not accessible from the outside of the head, as is the case where the shaft is originally formed integral with the head.

The invention is particularly valuable in the larger sizes of drills where it is expensive to discard the head each time the cutters and bearings are worn out. The head may now be used repeatedly by simply removing the cutters and shafts and substituting a new set.

What I claim as new is:

1. A well drill including a unitary head with a plurality of downwardly flaring legs, a flattened face on each leg, a counterbore in said face extending part way through the leg, a cutter shaft, a cutter rotatable thereon and enclosing one end thereof, a projection on said shaft to engage within said counterbore, the end of said projection being beveled off to permit said shaft to move vertically upwardly to shoulder said projection in said counterbore, and means to secure said shaft rigidly in position.

2. A well drill including a unitary head with a a plurality of downwardly flaring legs, a flattened face on each leg, a counterbore in said face inclined upwardly and extending only part way through said leg, a cutter shaft, a cutter rotatable thereon, a projection on said shaft to engage within said counterbore, the end of said projection being beveled off to permit said shaft to move vertically upwardly to shoulder said projection in said counterbore, a shoulder on said leg about said projection to engage said flattened face, and means to secure said shoulder rigidly to said face.

3. A unitary drill head, a plurality of downwardly flaring legs thereon, the inner faces of said legs being flattened and converging upwardly, a plurality of cutter shafts, cutters thereon, the outer ends of said cutter shafts having reduced projections thereon, counterbores in said flattened faces extending part way through said legs and into which said projections engage, the ends of said projections being beveled to allow said cutters and shafts to be inserted as an assembly vertically upwardly into position with said projections shouldering in said counterbores and a bond of welding material around each shaft securing it to the adjacent flattened face.

4. A unitary drill head, downwardly flaring legs thereon, a flattened shaft receiving face on each leg, a recess in said face, a cutter shaft, a cutter thereon, a projection on said shaft to fit within said recess, a shoulder about said projection to engage said face and space the end slightly from said face, an annular recess about the margin of said shaft, a bond of welded metal in said annular recess to secure said shaft to said face, there being a space between said bond and said shoulder.

FLOYD L. SCOTT.